United States Patent
Negoro et al.

(10) Patent No.: US 7,982,421 B2
(45) Date of Patent: Jul. 19, 2011

(54) ELECTRIC VEHICLE CONTROLLER

(75) Inventors: Hideto Negoro, Chiyoda-ku (JP);
Masaki Kono, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 274 days.

(21) Appl. No.: 12/446,470

(22) PCT Filed: Oct. 10, 2007

(86) PCT No.: PCT/JP2007/069725
§ 371 (c)(1),
(2), (4) Date: Apr. 21, 2009

(87) PCT Pub. No.: WO2008/053675
PCT Pub. Date: May 8, 2008

(65) Prior Publication Data
US 2010/0194322 A1    Aug. 5, 2010

(30) Foreign Application Priority Data
Nov. 2, 2006   (WO) .................. PCT/JP2006/321945

(51) Int. Cl.
H02H 7/08    (2006.01)
(52) U.S. Cl. ......... 318/454; 318/452; 318/453; 318/445
(58) Field of Classification Search .................. 318/454, 318/452, 453, 445
See application file for complete search history.

(56) References Cited

U.S. PATENT DOCUMENTS

| | | | | |
|---|---|---|---|---|
| 5,629,592 | A * | 5/1997 | Henmi | 318/107 |
| 7,411,370 | B2 * | 8/2008 | Kono | 318/802 |

FOREIGN PATENT DOCUMENTS

| | | |
|---|---|---|
| JP | 61-081102 | 4/1986 |
| JP | 61-081102 A | 4/1986 |
| JP | 5-095605 A | 4/1993 |
| JP | 2003-018898 A | 1/2003 |
| JP | 2003-219504 | 7/2003 |
| JP | 2004-064905 A | 2/2004 |
| JP | 2004-264298 | 9/2004 |
| JP | 2004-264298 A | 9/2004 |
| JP | 3732784 B2 | 10/2005 |
| JP | 2005-328619 | 11/2005 |
| JP | 2006-029938 A | 2/2006 |

OTHER PUBLICATIONS

Office Action (Notification of Reason(s) for Refusal) dated Nov. 17, 2010, issued in the corresponding Korean Patent Application No. 10-2009-7007832, and an English Translation thereof.
*Form PCT/ISA/210 (International Search Report) dated Jan. 8, 2008. *Copy attached.

* cited by examiner

*Primary Examiner* — Walter Benson
*Assistant Examiner* — David S Luo
(74) *Attorney, Agent, or Firm* — Buchanan Ingersoll & Rooney PC

(57) ABSTRACT

An electric vehicle controller includes a speed sensorless vector controller for estimating the rotating speed of an AC motor from an output voltage command and an output current from a VVVF inverter, and controlling the VVVF inverter based on the estimate. An overhead wire current detector detects the current flowing through an overhead wire. A wrong action sensor senses an abnormality in the speed sensorless vector controller from the sign of the current flowing through the overhead wire and detected by the overhead wire current detector when the VVVF inverter is in operation. A gate stop circuit stops the VVVF inverter when the wrong action sensor senses an abnormality.

3 Claims, 9 Drawing Sheets

ELECTRIC VEHICLE CONTROLLER

TECHNICAL FIELD

The invention relates to a controller of an electric vehicle, the drive source of which is an AC motor driven by a variable voltage variable frequency inverter (hereinafter also referred to as a VVVF inverter) without using a speed detector, and particularly to a technology for detecting an abnormal speed estimate required in the control.

BACKGROUND ART

A VVVF-inverter-based method for precisely controlling an AC motor without using a speed detector has been proposed in recent years (see Patent Documents 1 and 2, for example).

In such a method for controlling an AC motor without using a speed detector, a speed estimate is computed based on, for example, a detected current value to control the VVVF inverter. However, when the computed speed estimate is not correct due to current detector failure, wiring breakage, or other defects, overcurrent frequently occurs if any of the defects is left unaddressed, possibly resulting in breakage of parts of the VVVF inverter. It is therefore necessary to quickly sense such an abnormal speed estimate.

Patent Document 1: Japanese Patent No. 3,732,784 (FIG. 6, Equation 28)

Patent Document 2: Japanese Unexamined Patent Application Publication No. 2004-64905 (FIG. 1)

DISCLOSURE OF THE INVENTION

Problem that the Invention is to Solve

However, the method for driving and controlling an electric vehicle and an apparatus for controlling the same described in Patent Document 1 are configured to compute a current reference $IL^*$ by using an effective power reference $P^*$ and a DC voltage $Vdc$, compute a deviation between the current reference $IL^*$ and a detected overhead wire current value $IL$, and when the deviation is not between a lower limit $\alpha$ and an upper limit $\beta$, judge that a speed estimate in question is abnormal.

The current reference $IL^*$ is determined by dividing the effective power reference $P^*$ by the DC voltage $Vdc$. The current reference $IL^*$ is therefore not the current flowing through the overhead wire in an exact sense, but the current inputted to the inverter. As a result, when an overhead wire current and an overhead wire current reference are used to determine the deviation, the lower limit $\alpha$ and the upper limit $\beta$ are relatively readily determined, but it is significantly difficult to determine the setting constants, of the lower limit $\alpha$ and the upper limit $\beta$, since the deviation between the current flowing through the overhead wire and the current inputted to the inverter are computed.

Further, when the AC motor or the VVVF inverter is changed, the effective power reference $P^*$ also needs to be changed. The lower limit $\alpha$ and the upper limit $\beta$ therefore need to be changed whenever the AC motor or the VVVF inverter is changed.

In the electric vehicle controller described in Patent Document 2, a discriminator is used to discriminate the direction of the inverter input current detected by a current detector, and the result is compared with a drive command signal to sense abnormality. It is highly possible that a false abnormal action is sensed.

For example, immediately after the drive command signal is turned off in a notch-off operation or the like, s small amount of inverter input current flows for a short period. The thus flowing input current and the turned-off drive command signal are discriminated, and likely judged as an abnormal action.

As another example, when the abnormality sensing system described above does not stop the inverter, but a protection operation performed by another protection means against, for example, overcurrent or overvoltage abruptly stops the inverter, the inverter input current transiently operates in the abruptly stopped inverter. A current therefore flows in the direction opposite to the drive command signal, which activates the abnormality sensing system and results in false sensing. Such false sensing will lower the reliability of the system.

The invention has been made to solve the above problems. An object of the invention is to provide an electric vehicle controller comprised of a simply configured control system that senses the sign of the overhead wire current or the sign of the inverter current to sense an abnormal speed estimate, the controller capable of readily determining setting constants and sensing an abnormal speed estimate without changing the setting constants even when the AC motor or the variable voltage variable frequency inverter is changed.

Another object of the invention is to provide an electric vehicle controller that does not falsely sense an abnormal speed estimate but can correctly and reliably sense an abnormal speed estimate.

Means for Solving the Problems

An electric vehicle controller according to the invention includes a VVVF inverter (variable voltage variable frequency inverter) that converts a direct current into an alternating current having an arbitrary frequency based on a powering command or a brake command, an AC motor connected to the AC-side of the VVVF inverter, a filter capacitor connected in parallel to the DC-side of the VVVF inverter, current detection means for detecting information on the current on the AC-side of the VVVF inverter, voltage detection means for detecting information on the DC voltage across the filter capacitor, and speed sensorless vector control means for estimating the rotating speed of the AC motor from an output voltage command from the VVVF inverter and an output current from the VVVF inverter and controlling the VVVF inverter based on the estimate. The controller further includes DC current detection means, either of overhead wire current detection means for detecting the current flowing through an overhead wire or inverter current detection means for detecting the inverter current flowing through the VVVF inverter, wrong action sensing means for determining the sign of the DC current, when the VVVF inverter is in operation by using either of the commands of the powering command or the brake command, either of the DC currents, the overhead wire current or the inverter current detected by the DC current detection means, and a predetermined current setting, and sensing abnormality in the speed sensorless vector control means from the sign of the DC current, and gate stop means for stopping the VVVF inverter when the wrong action sensing means senses abnormality.

Another electric vehicle controller according to the invention includes a VVVF inverter (variable voltage variable frequency inverter) that converts a direct current into an alternating current having an arbitrary frequency based on a powering command or a brake command, an AC motor connected to the AC-side of the VVVF inverter, a filter capacitor connected in parallel to the DC-side of the VVVF inverter, current detection means for detecting information on the current on the AC-side of the VVVF inverter, voltage detection means for detecting information on the DC voltage across the filter capacitor, and speed sensorless vector control means for estimating the rotating speed of the AC motor from an output voltage command from the VVVF inverter and an output current from the VVVF inverter and controlling the VVVF inverter based on the estimate. The controller further includes DC current estimation means, either of overhead wire current estimation means for estimating the current flowing through an overhead wire or inverter current estimation means for estimating the inverter current flowing through the VVVF inverter, wrong action sensing means for determining the sign of the estimated DC current value, when the VVVF inverter is in operation by using either of the commands, the powering command or the brake command, either of the estimated DC current values, either of the estimated overhead wire current value or the estimated inverter current value estimated by the DC current estimation means, and a predetermined current setting, and sensing abnormality in the speed sensorless vector control means from the sign of the estimated DC current value, and gate stop means for stopping the VVVF inverter when the wrong action sensing means senses abnormality.

ADVANTAGE OF THE INVENTION

The electric vehicle controller of the invention can detect an abnormal speed estimate, that is, abnormality in the speed sensorless vector control means in a simple, low-cost configuration, and prevent in advance failure of parts of the inverter apparatus due to overcurrent.

Further, the setting constants for judging abnormality can be readily set, whereby an abnormal speed estimate can be sensed without changing the setting constants even when the AC motor or the variable voltage variable frequency inverter is changed.

A reliable electric vehicle controller that does not falsely sense an abnormal speed estimate but can correctly and reliably sense an abnormal speed estimate can be provided.

The above and other objects, features, and advantageous effects of the invention will be apparent from the detailed description in the following embodiments and the drawings.

DESCRIPTION OF REFERENCE NUMERALS AND SIGNS

Figure 1:
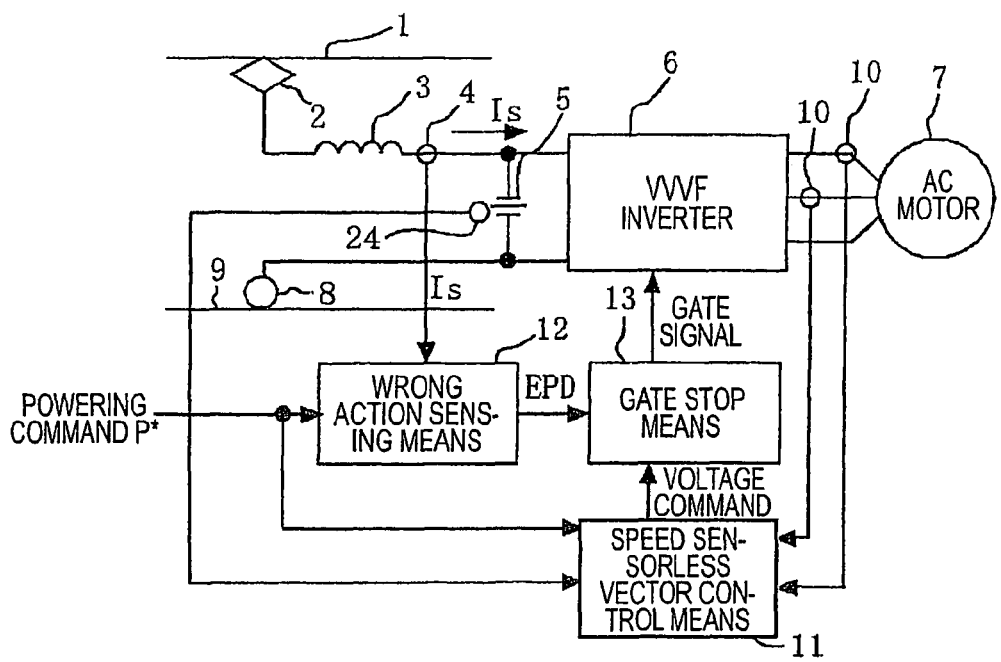
FIG. 1 shows the configuration of an electric vehicle controller according to a first embodiment.

1 Overhead wire
3 DC filter reactor
4 Overhead wire current detection means
5 Filter capacitor
6 Variable voltage variable frequency inverter (VVVF inverter)
7 AC motor
8 Wheel
9 Rail
10 Current detection means
11 Speed sensorless vector control means
12 Wrong action sensing means
13 Gate stop means
14 Wrong regeneration sensing means
15 Wrong powering sensing means
16 Wrong regeneration sensing time element means
17 Wrong powering sensing time element means
18 Powering/regeneration sensing selection means
19 Comparison means in powering mode
20 Comparison means in regeneration mode
21 Overhead wire current condition in powering mode EPDPLVL (first current setting)
22 Overhead wire current condition in regeneration mode EPDBLVL (second current setting)
23 Overhead wire current estimation means
24 Voltage detection means
25 Inverter (NOT) circuit
26 Gate signal generation circuit
28 Multiplier
28 Capacitor input current estimation means
29 Inverter DC input current estimation means
30 Adder
31 Wrong action sensing means
32 Gate stop means
33 If-greater comparison means
34 Overhead wire current condition setting means in regeneration mode
35 Regeneration time element means
36 Multiplication means
37a, 37b Inversion (NOT) means
38 Latch means
39 Switching means
40 Time element (ONTD) means
41 Time element (ONTD) means 42 Switching means
43 Variable time element (ONTD) means
44 Offset compensation means
45 Integration means
46 Time element (ONTD) means
47 Switching means
48 Division means
49 Subtraction means
50 Switching means
51 Offset computation means
52 Switching means
53 Inverter current detection means
54 Inverter current estimation means

BEST MODE FOR CARRYING OUT THE INVENTION

Embodiments of the invention will be described below with reference to the drawings.

Throughout the drawings, the same reference characters represent the same portions or equivalent portions.

First Embodiment

An electric vehicle controller according to a first embodiment of the invention will be described below with reference to FIGS. 1 to 5.

FIG. 1 shows the configuration of the electric vehicle controller according to the first embodiment.

While the first embodiment is described with reference to a case where an induction motor is controlled as an example of an AC motor, the same advantageous effect can of course be expected even when the AC motor is a synchronous motor.

Further, while the first embodiment is described with reference to a controller of an electric vehicle that operates in accordance with a powering command P*, the electric vehicle can also operate in accordance with a brake command B*, as will be described later.

In FIG. 1, an overhead wire 1 is connected to the positive potential of a DC filter capacitor 5 via a pantograph 2 and a DC filter reactor 3. The negative potential of the DC filter capacitor 5 is grounded to a rail 9 via a wheel 8. Further, a variable voltage variable frequency inverter (hereinafter also referred to as a VVVF inverter) 6 that converts a direct current into an alternating current having an arbitrary frequency is connected in parallel to the DC filter capacitor 5. The VVVF inverter 6 applies a three-phase voltage to an AC motor 7, which is an induction motor. AC-side current detection means 10 detects phase currents iu and iv generated in the AC motor 7.

While FIG. 1 shows, as the AC-side current detection means 10, a detector that detects a current flowing through a circuit connecting the VVVF inverter 6 to the AC motor 7 by using a CT or the like, any other suitable known method along with a current flowing through the VVVF inverter 6, such as a bus current, may be used to detect the phase currents.

Since the following relationship is satisfied: iu+iv+iw=0, the w-phase current can be determined from the two detected phase currents, u-phase and v-phase currents.

Although the AC motor 7 and the wheel 8 are illustrated to be independent of each other for ease of illustration, in practice, the AC motor 7 is connected to the wheel 8 via a gear, and the wheel 8 is in contact with the rail 9.

On the other hand, overhead wire current detection means 4 is further provided, the overhead wire current detection means 4 detects a current Is flowing through the overhead wire 1 and the DC filter reactor 3. The value of the overhead wire current Is detected by the overhead wire current detection means 4 is inputted to wrong action sensing means 12 (which will be described later in detail).

Now, define a positive direction as the direction in which the overhead wire current value Is detected by the overhead wire current detection means 4 flows through the overhead wire 1 and the VVVF inverter 6 to the AC motor 7 (flowing in the direction indicated by the arrow in FIG. 1). The overhead wire current Is flows in the positive direction during a powering operation (the sign of the current value is positive).

Conversely, the overhead wire current Is flows from the AC motor 7 through the VVVF inverter 6 to the overhead wire 1 during a regeneration operation (the sign of the current value is negative), which is called a negative direction. That is, the current flows in the opposite direction to the arrow in FIG.

Speed sensorless vector control means 11 estimates the rotating speed of the AC motor 7 from an output voltage command from the VVVF inverter 6 and an output current from the VVVF inverter 6, controls the VVVF inverter 6 based on the estimate, and drives and controls the AC motor 7. The control system in the speed sensorless vector control means 11 is based on a speed sensorless vector control method by which the current, voltage, and magnetic flux of the AC motor 7 are controlled in a dq-axis rotating coordinate system.

Since the speed sensorless vector control means 11 is an existing technology, detailed description thereof will be herein omitted.

The wrong action sensing means 12 will now be described.

Figure 2:
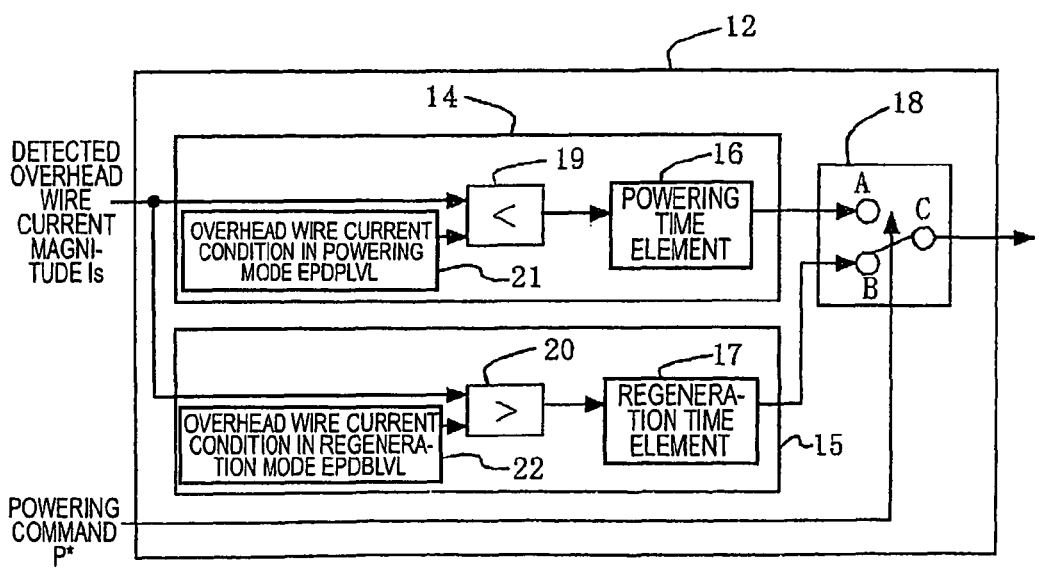
FIG. 2 shows the configuration of wrong action sensing means in the first embodiment.

FIG. 2 shows an example of the configuration of the wrong action sensing means 12. In FIG. 2, reference numeral 14 denotes wrong regeneration sensing means for detecting abnormality in the powering operation, and includes comparison means in powering mode 19 for comparing a detected overhead wire current value Is detected by the overhead wire current detection means 4 with an overhead wire current condition in powering mode EPDPLVL 21, which is a first current setting set to identify wrong regeneration, and wrong regeneration sensing time element means (powering time element) 16 for imparting a sensing time element corresponding to a certain period to the detection result from the comparison means 19 (delaying the detection result) and outputting the detection result.

The reference numeral 15 denotes wrong powering sensing means for sensing abnormality in the regeneration operation, and includes comparison means in regeneration mode 20 for comparing a detected overhead wire current value Is detected by the overhead wire current detection means 4 with an overhead wire current condition in regeneration mode EPDBLVL 22, which is a second current setting set to identify wrong powering, and wrong powering sensing time element means (regeneration time element) 17 for imparting a sensing time element corresponding to a certain period to the detection result from the comparison means 20 (delaying the detection result) and outputting the detection result.

The reference numeral 18 denotes powering/regeneration sensing selection means for selecting either the wrong regeneration sensing means 14 or the wrong powering sensing means 15 depending on either the power operation or the regeneration operation based on the powering command P*.

The powering command P* is obtained from a value according to the position of the command, which is a speed regulator on an operation panel in the electric vehicle.

The thus configured wrong action sensing means 12 in principle uses, as described above, the fact that the overhead wire current Is flows in the positive direction (that is, the overhead wire current Is has the positive sign) when the speed sensorless vector control means 11 instructs the normal powering operation.

On the other hand, the wrong operation sensing means 12 uses the fact that the overhead wire current Is flows in the negative direction (that is, the overhead wire current Is has the negative sign) when the speed sensorless vector control means 11 instructs the normal regeneration operation.

That is, the wrong operation sensing means 12 judges that abnormality occurs when the speed sensorless vector control means 11 instructs the powering operation and the overhead wire current Is does not flow in the positive direction but flows in the negative direction, and stops the VVVF inverter 6 by using gate stop means 13.

The wrong operation sensing means 12 judges that abnormality occurs when the speed sensorless vector control means 11 instructs the regeneration operation and the overhead wire current Is does not flow in the negative direction but flows in the positive direction, and stops the VVVF inverter 6 by using the gate stop means 13.

Next, the operation of the thus configured electric vehicle controller according to the first embodiment will be described.

First, a method for judging that abnormality occurs in the speed sensorless vector control means in the powering mode will be described. The overhead wire current value Is detected by the overhead wire current detection means 4 shown in FIG. 1 is inputted to the wrong action sensing means 12.

Figure 4:
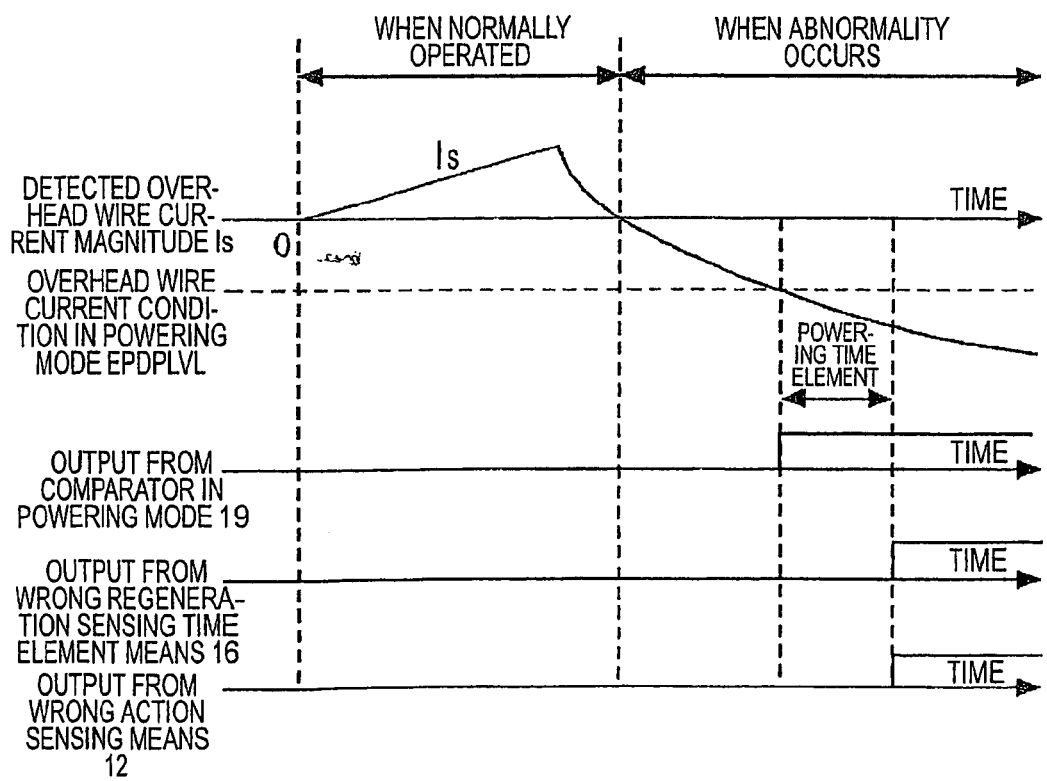
FIG. 4 explains the behavior of each parameter of the wrong action sensing means in a powering mode in the first embodiment.

FIG. 4 shows the behavior of each parameter of the wrong action sensing means 12 in the powering mode. The behavior will be described below with reference to FIGS. 2 and 4.

First, since the powering command P* is inputted to the wrong action sensing means 12 and the speed sensorless vector control means 11 in the powering mode, a contact A is connected to a contact C in the powering/regeneration sensing selection means 18.

As shown in FIG. 4, the overhead wire current Is flows in the positive direction during the normal operation.

Since abnormality causes the overhead wire current Is to flow in the negative direction, the comparison means in powering mode 19 compares this overhead wire current Is with the overhead wire current condition in powering mode EPDPLVL 21, which is the first current setting. For example, the overhead wire current condition in powering mode EPDPLVL 21 is set to −10 A, and the comparison means in powering mode 19 detects that the overhead wire current Is becomes smaller than −10 A (overhead wire current condition in powering mode EPDPLVL 21).

Based on the detected result, the wrong regeneration sensing time element means 16 provides a sensing time element (delay) corresponding to a certain period in order to prevent false sensing due to, for example, a transitional response. When the overhead wire current Is remains smaller than the overhead wire current condition in powering mode EPDPLVL 21 even after the period corresponding to the time element (delay) has elapsed, the wrong action sensing means 12 outputs a wrong action sensed signal EPD to the gate stop means 13.

The setting period of the time element may be longer than or equal to the period corresponding to the resonant frequency between the DC filter reactor 3 and the DC filter capacitor 5 in consideration of the response of the overhead wire current Is.

Next, a method for judging that abnormality occurs in the speed sensorless vector control means in the regeneration mode will be described.

Figure 5:
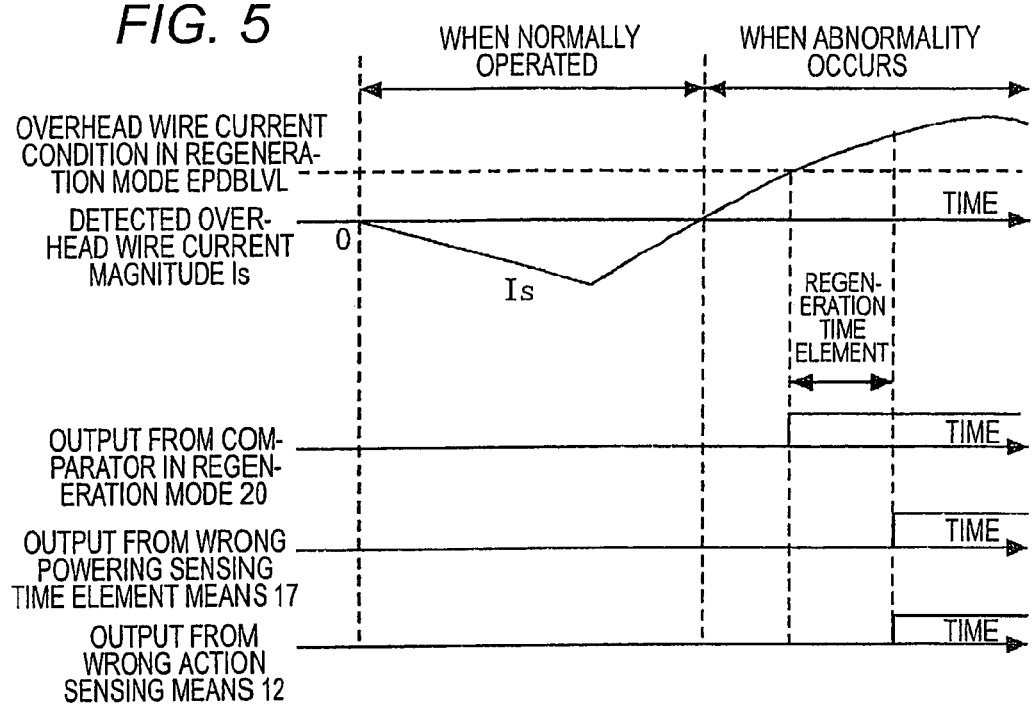
FIG. 5 explains the behavior of each parameter of the wrong action sensing means in a regeneration mode in the first embodiment.

FIG. 5 shows the behavior of each parameter of the wrong action sensing means 12 in the regeneration mode. The behavior will be described below with reference to FIGS. 2 and 5.

First, since no powering command P* is inputted in the regeneration mode, a contact B is connected to the contact C in the powering/regeneration sensing selection means 18.

As shown in FIG. 5, the overhead wire current Is flows in the negative direction during the normal operation. Since abnormality causes the overhead wire current Is to flow in the positive direction, the comparison means in regeneration mode 20 compares this overhead wire current Is with the overhead wire current condition in regeneration mode EPDBLVL 22, which is the second current setting.

For example, the overhead wire current condition in regeneration mode EPDBLVL 22 is set to +10 A, and the comparison means in regeneration mode 20 detects that the overhead wire current Is becomes greater than +10 A (overhead wire current condition in regeneration mode EPDBLVL 22).

Based on the detected result, the wrong powering sensing time element means 17 provides a sensing time element (delay) corresponding to a certain period in order to prevent false sensing due to, for example, a transitional response. When the overhead wire current Is remains greater than the overhead wire current condition in regeneration mode EPDBLVL 22 even after the period corresponding to the time element (delay) has elapsed, the wrong action sensing means 12 outputs the wrong action sensed signal EPD to the gate stop means 13.

The setting period of the time element may be longer than or equal to the period corresponding to the resonant frequency between the DC filter reactor 3 and the DC filter capacitor 5 in consideration of the response of the overhead wire current Is.

When the wrong action sensing means 12 judges from the positive or negative sign of the overhead wire current Is that abnormality occurs (EPD=1), it is judged that a protection operation should be performed, and the gate stop means 13 turns off a gate signal to all switching devices in the VVVF inverter 6.

Figure 3:
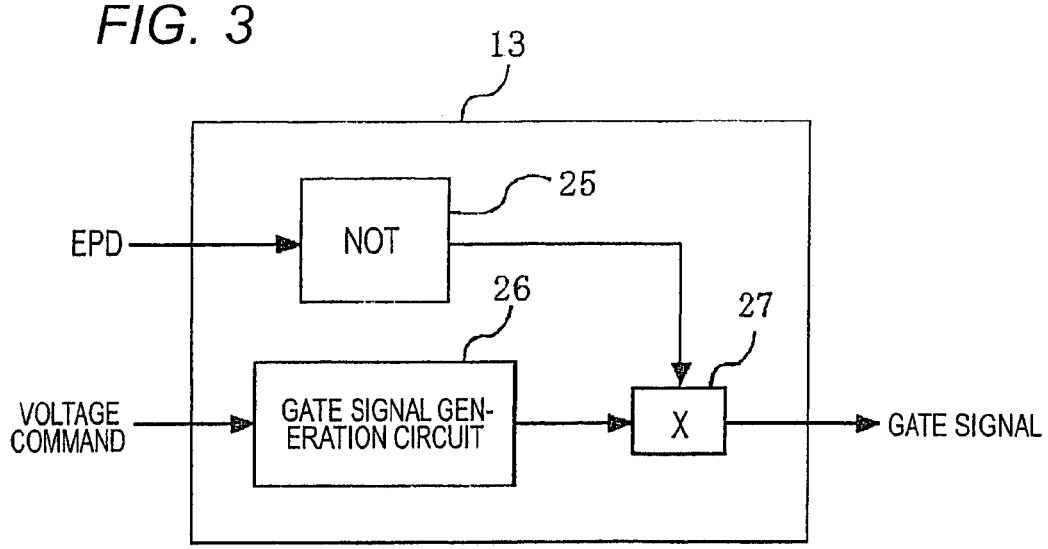
FIG. 3 shows the configuration of gate stop means in the first embodiment.

FIG. 3 shows an example of the configuration of the gate stop means 13.

In FIG. 3, the gate stop means 13 instructs a gate signal command generation circuit 26 to generate the gate signal based on a voltage command computed by the speed sensorless vector control means 11.

When the wrong action sensing means 12 judges that abnormality occurs, the signal EPD becomes 1, and an inverter (NOT) circuit 25 inverts the signal into zero. The resultant signal is inputted to a multiplier 27 to turn off the gate signal (zero) to all switching devices in the VVVF inverter 6.

Since the gate signal generation circuit 26 is an existing technology, description thereof will be herein omitted.

As described above, the electric vehicle controller according to the present embodiment includes the VVVF inverter (variable voltage variable frequency inverter) 6 that converts a direct current into an alternating current having an arbitrary frequency based on the powering command P* or the brake command B*, which will be described later, the AC motor 7 connected to the AC-side of the VVVF inverter 6, the filter capacitor 5 connected in parallel to the DC-side of the VVVF inverter 6, the current detection means 10 for detecting information on the current on the AC-side of the VVVF inverter 6, the voltage detection means 24 for detecting information on the DC voltage across the filter capacitor 5, and the speed sensorless vector control means 11 for estimating the rotating speed of the AC motor 7 from the output voltage command from the VVVF inverter 6 and the output current from the VVVF inverter 6 and controlling the VVVF inverter 6 based on the estimate. The controller further includes the overhead wire current detection means (DC current detection means) 4 for detecting the current flowing through the overhead wire 1, the wrong action sensing means 12 for determining the sign of the overhead wire current when the VVVF inverter 6 is in operation by using either of the powering command P* or the brake command B*, the overhead wire current (DC current) detected by the overhead wire current detection means (DC current detection means) 4, and a predetermined current setting and sensing abnormality in the speed sensorless vector control means 11 from the sign of the DC current, and the gate stop means 13 for stopping the VVVF inverter 6 when the wrong action sensing means 12 senses abnormality.

The wrong action sensing means 12 according to the present embodiment includes the wrong regeneration sensing means 14 for comparing the overhead wire current value (DC current) detected by the overhead wire current detection means 4 with the first current setting set to judge wrong regeneration when the VVVF inverter 6 is operated in the powering mode, the wrong powering sensing means 15 for comparing f the overhead wire current value (DC current) detected by the overhead wire current detection means 4 with the second current setting set to judge wrong powering when the VVVF inverter 6 is operated in the regeneration mode, and the powering/regeneration sensing selection means 15 for selecting the wrong regeneration sensing means 14 during the powering operation, whereas selecting the wrong powering sensing means 15 during the regeneration operation based on the powering command P* (or the brake command B*).

The wrong regeneration sensing means 14 according to the present embodiment includes the wrong regeneration sensing time element means 16 for allowing a fixed period to elapse after the value of the current flowing through the overhead wire 1 and detected by the overhead wire current detection means 4 becomes smaller than the first current setting, and the wrong powering sensing means 15 includes the wrong powering sensing time element means 17 for allowing a fixed period to elapse after the value of the current flowing through the overhead wire 1 and detected by the overhead wire current detection means 4 becomes greater than the second current setting.

As described above, according to the present embodiment, providing the wrong action sensing means for sensing abnormality in the speed sensorless vector control means from the sign of the overhead wire current detected by the overhead wire current detection means when the VVVF inverter is operated based on the powering command P* or the brake command B*, and stopping the VVVF inverter when the wrong action sensing means senses abnormality allow abnormality in the speed sensorless vector control means to be readily detected in a significantly simple, inexpensive configuration, and prevent in advance failure of parts of the inverter apparatus due to overcurrent.

Further, the setting constants for judging abnormality can be readily set, whereby an abnormal speed estimate can be sensed without changing the setting constants even when the AC motor or the variable voltage variable frequency inverter is changed.

Moreover, separating the processes in the powering mode from those in the regeneration mode allows different conditions to be respectively set for the powering and regeneration modes, whereby an abnormal speed estimate can be sensed in each of the powering and regeneration modes.

Further, providing the wrong regeneration sensing time element means for allowing a fixed period to elapse after the overhead wire current value detected by the overhead wire current detection means becomes smaller than the first current setting set to judge wrong regeneration, and the wrong powering sensing time element means for allowing a fixed period to elapse after the overhead wire current value detected by the overhead wire current detection means becomes greater than the second current setting set to judge wrong powering can prevent false sensing made by the wrong regeneration sensing means and the wrong powering sensing means due to, for example, a transitional response.

Second Embodiment

Figure 6:
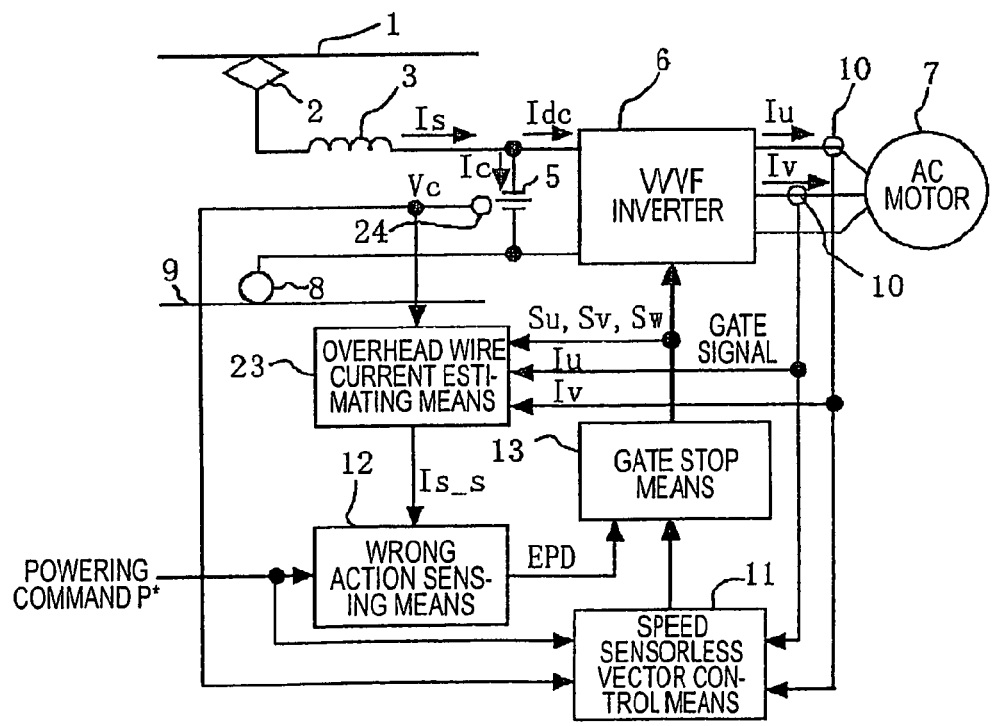
FIG. 6 shows the configuration of an electric vehicle controller according to a second embodiment.

FIG. 6 shows the configuration of an electric vehicle controller according to a second embodiment of the invention.

The portions that are the same as those in the first embodiment described above have the same reference characters. Description of the same portions will be omitted, and only the different portions will be described.

While the second embodiment is also described with reference to a controller of an electric vehicle that operates in accordance with the powering command P*, the electric vehicle can also operate in accordance with the brake command B*.

The second embodiment is characterized in that overhead wire current estimation means 23 is provided and an output therefrom is inputted to the wrong action sensing means 12, as shown in FIG. 6.

Therefore, in the present embodiment, an overhead wire current estimate estimated (computed) in the overhead wire current estimation means 23, instead of a detected overhead wire current value, is inputted to the wrong action sensing means 12.

In the first embodiment, an overhead wire current value Is detected by the overhead wire current detection means 4 is inputted to the wrong action sensing means 12, and abnormality in the speed sensorless vector control means 11 is judged.

It is therefore necessary in the first embodiment to prepare the overhead wire current detection means 4 that detects the current flowing through the overhead wire 1, disadvantageously resulting in increase in the manufacturing cost of the apparatus and reduction in reliability of the apparatus due to increase in the number of parts.

In the second embodiment, as shown in FIG. 6, the overhead wire current estimation means 23, which estimates the value of the current flowing through the overhead wire 1, eliminates the need for the overhead wire current detection means 4 used in the first embodiment. Abnormality in the speed sensorless vector control means 11 can thus be judged at a lower cost without reduction in reliability of the apparatus.

Figure 7:
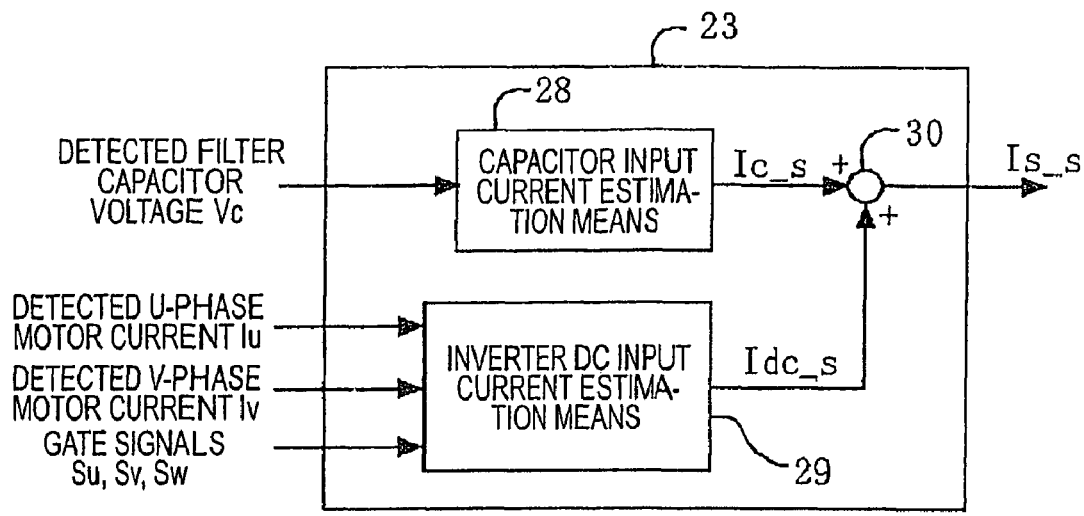
FIG. 7 shows the configuration of overhead wire current estimation means in the second embodiment.

FIG. 7 shows the configuration of the overhead wire current estimation means 23. As shown in FIG. 7, the overhead wire current estimation means 23 includes capacitor input current estimation means 28 for estimating a capacitor input current Ic, inverter DC input current estimation means 29 for estimating an inverter DC input current Idc, and an adder 30 that adds the estimated capacitor input current Ic_s estimated by the capacitor input current estimation means 28 to the estimated inverter DC current Idc_s estimated by the inverter DC input current estimation means 29.

The capacitor input current estimation means 28 for estimating the capacitor input current Ic in the overhead wire current estimation means 23 differentiates a capacitor voltage Vc with respect to time, the capacitor voltage Vc detected by voltage detection means 24 for detecting information on the DC voltage across the filter capacitor 5 connected in parallel to the DC-side of the VVVF inverter 6. The capacitor input current estimation means 28 further multiplies the resultant derivative by filter capacitor capacitance C to calculate the estimated capacitor input current Ic_s in accordance with the following equation (1)

[Equation 1]

$$\text{Ic\_s} = C\frac{dVc}{dt} \quad (1)$$

The differentiation used in the equation (1) may be difficult to perform in software implemented in a microcomputer or other components or may result in divergent computation. To address the problem, the following equation (2) may be used in practice.

[Equation 2]

$$\text{Ic\_s} = C\frac{s}{1+sT}Vc \quad (2)$$

$$\text{where } s = \frac{d}{dt}$$

represents the Laplacian, and T represents a time constant.

The time constant T may be set to a value similar to the maximum operating frequency of the VVVF inverter 6.

For example, when the maximum operating frequency of the VVVF inverter 6 is 200 Hz, the time constant T in the equation (2) can be calculated in accordance with the following equation (3). In this case, the time constant T may be set to approximately 80 msec.

[Equation 3]

$$T = \frac{1}{2\times\pi\times 200} = 79.6 \text{ msec} \quad (3)$$

Figure 8:
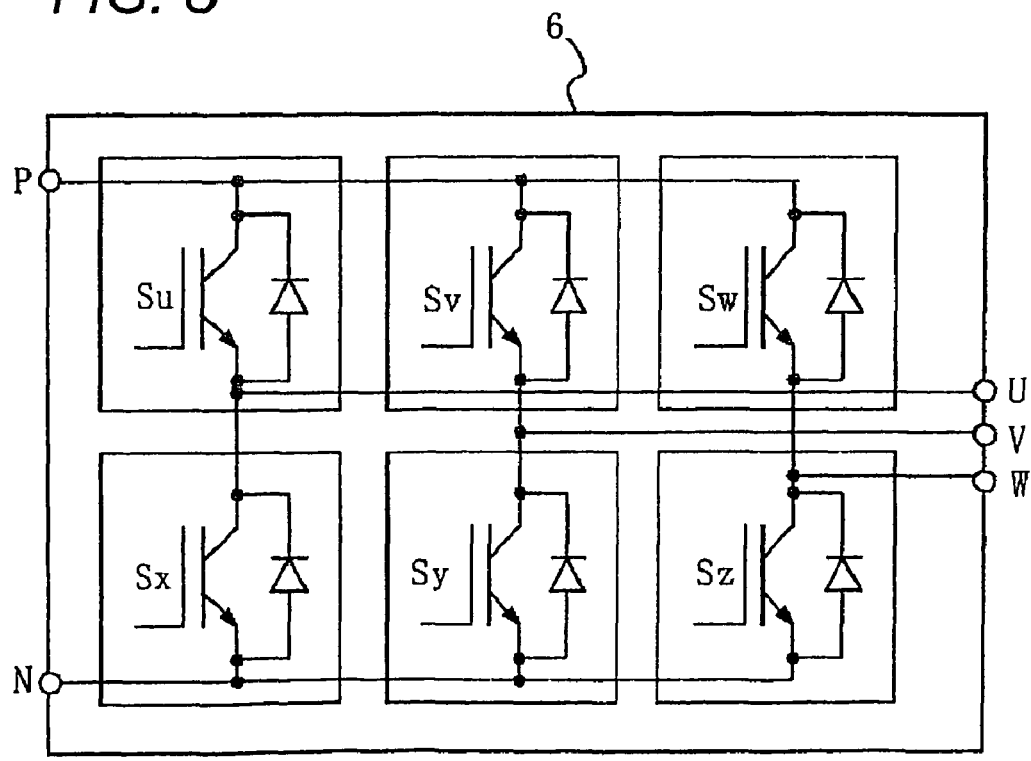
FIG. 8 is a circuit configuration diagram of a VVVF inverter used in the invention.

The configuration of the VVVF inverter 6 includes six switching devices (Su, Sv, Sw, Sx, Sy, and Sz), such as IGBTs (insulated gate bipolar transistors), as shown in FIG. 8, for example.

In the VVVF inverter 6, if two switching devices for each phase are turned on at the same time, the DC voltage is shorted and the short-circuit current damages the switching devices.

In the actual VVVF inverter 6, to prevent two switching devices for each phase from being turned on at the same time, a top-down short circuit prevention period (also referred to as a dead time) Td is provided.

The inverter DC input current estimation means 29 for estimating the inverter DC input current Idc in the overhead wire current estimation means 23 uses the states of the switching devices Su, Sv, Sw, Sx, Sy, and Sz in the VVVF inverter 6 shown in FIG. 8 and detected value from the current detection means 10 for detecting information on the current on the AC-side of the VVVF inverter 6 to compute the estimated inverter DC input current Idc_s in accordance with the following equation (4):

[Equation 4]

$$\begin{aligned}\text{Idc\_s} &= Iu\times Su + Iv\times Sv + Iw\times Sw \\ &= Iu\times Su + Iv\times Sv + (-Iu - Iv)\times Sw \\ &= Iu\times (Su - Sw) + Iv\times (Sv - Sw)\end{aligned} \quad (4)$$

Since each of Su, Sv, and Sw is a function showing the state of the corresponding switching device, Su, Sv, and Sw can be defined as ON (represented as +1) and OFF (represented as 0) in the following conditions:

Su, Sv, and Sw=+1: when the switching devices Su, Sv, and Sw on the positive side (P) are ON, or during the period Td and when the motor currents Iu, Iv, and Iw are smaller than zero.

Su, Sv, and Sv=0: when the switching devices Su, Sv, and Sw on the positive side (P) are OFF, or during the period Td and when the motor currents Iu, Iv, and Iw are greater than zero.

While the method for estimating the inverter DC input current in accordance with the equation (4) has been described in the second embodiment, the inverter DC input current can of course alternatively be calculated by calculating the inverter power and dividing the inverter power by the capacitor voltage Vc, or by using another estimating method different from the equation (4).

The actions and effects of the wrong action sensing means 12 and the following components, which are the actions of sensing abnormality in the speed sensorless vector control means 11 by using the estimated overhead wire current value Is_s computed by the overhead wire current estimation means 23 are the same as those in the first embodiment. Description of these actions and effects will therefore be omitted.

As described above, the electric vehicle controller according to the present embodiment includes the VVVF inverter (variable voltage variable frequency inverter) 6 that converts a direct current into an alternating current having an arbitrary frequency based on the powering command P* or the brake command B*, the AC motor 7 connected to the AC-side of the VVVF inverter 6, the filter capacitor 7 connected in parallel to the DC-side of the VVVF inverter 6, the current detection means 10 for detecting information on the current on the AC-side of the VVVF inverter 6, the voltage detection means 24 for detecting information on the DC voltage across the filter capacitor 5, and the speed sensorless vector control means 11 for estimating the rotating speed of the AC motor 7 from the output voltage command from the VVVF inverter 6 and the output current from the VVVF inverter 6 and controlling the VVVF inverter 6 based on the estimate. The controller further includes the overhead wire current estimation means (DC current estimation means) 23 for estimating the current flowing through the overhead wire 1, the wrong action sensing means 12 for determining the sign of the estimated DC current value when the VVVF inverter 6 is in operation by using the powering command P* or the brake command B*, the estimated overhead wire current value (the estimated DC current value) estimated by the overhead wire current estimation means (DC current estimation means) 23, and a predetermined current setting and sensing abnormality in the speed sensorless vector control means 11 from the sign of the estimated overhead wire current value (the estimated DC current value), and the gate stop means 13 for stopping the VVVF inverter 6 when the wrong action sensing means 12 senses abnormality.

The overhead wire current estimation means 23 in the present embodiment includes the inverter DC input current estimation means 29 for estimating the inverter DC input current inputted through the overhead wire 1 to the VVVF inverter based on the current information detected by the current detection means 10 and the switching state in the VVVF inverter 6, the capacitor input current estimation means 28 for estimating the capacitor input current inputted through the overhead wire 1 to the filter capacitor 5, and the adder 30 that adds the estimated current value from the inverter DC input current estimation means 29 to the estimated current value from the capacitor input current estimation means 28 and inputs the resultant value to the wrong action sensing means 12.

The wrong action sensing means 12 in the present embodiment includes the wrong regeneration sensing means 14 for comparing the estimated overhead wire current value (estimated DC current value) estimated by the overhead wire current estimation means (DC current estimation means) 23 with the first current setting set to judge wrong regeneration when the VVVF inverter 6 is operated in the powering mode, the wrong powering sensing means 15 for comparing the estimated overhead wire current value (estimated DC current value) estimated by the overhead wire current estimation means (DC current estimation means) 23 with the second current setting set to judge wrong powering when the VVVF inverter 6 is operated in the regeneration mode, and the powering/regeneration sensing selection means 18 for selecting the wrong regeneration sensing means 14 in the powering operation, whereas selecting the wrong powering sensing means 15 in the regeneration operation based on the powering command or the brake command.

The wrong regeneration sensing means 14 in the present embodiment includes the wrong regeneration sensing time element means 16 for allowing a fixed period to elapse after the estimated value of the current flowing through the overhead wire 1 estimated by the overhead wire current estimation means 23 becomes smaller than the first current setting, and the wrong powering sensing means 15 includes the wrong powering sensing time element means 17 for allowing a fixed period to elapse after the estimated overhead wire current value estimated by the overhead wire current estimation means 23 becomes greater than the second current setting.

Therefore, the present embodiment, which senses abnormality in the speed sensorless vector control from the sign of the estimated overhead wire current value to stop the VVVF inverter, provides the same advantageous effect as that provided in the first embodiment, and the sensor for detecting the overhead wire current (that is, the overhead wire current detection means) can be omitted, unlike the first embodiment. It is therefore possible to reduce the number of parts and hence cost, and improve the reliability of the system.

Third Embodiment

The above first and second embodiments have been described with reference to the case where the operation of the electric vehicle is controlled based on the powering command P*. Third to sixth embodiments will be described with reference to a case where the operation of the electric vehicle is controlled based on the brake command B*.

Figure 9:
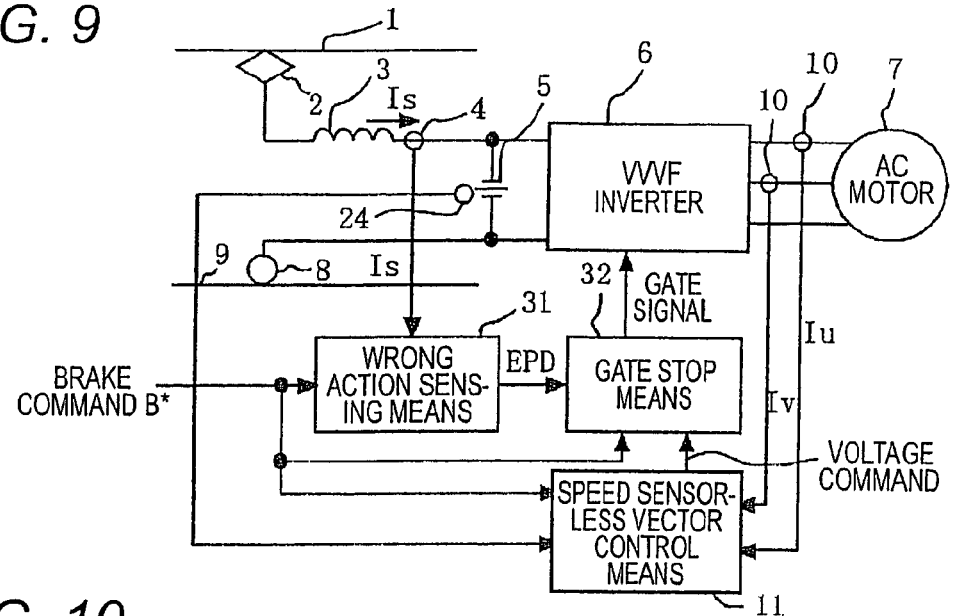
FIG. 9 shows the configuration of an electric vehicle controller according to a third embodiment.

FIG. 9 shows the configuration of an electric vehicle controller according to a third embodiment of the invention.

In FIG. 9, reference numeral 1 denotes an overhead wire. Reference numeral 2 denotes a pantograph. Reference numeral 3 denotes a DC filter reactor. Reference numeral 4 denotes overhead wire current detection means. Reference numeral 5 denotes a filter capacitor. Reference numeral 6 denotes a VVVF inverter. Reference numeral 7 denotes an AC motor, which is an induction motor.

Reference numeral 10 denotes AC-side current detection means, and the current detection means 10 detects phase currents iu, iv, and iw generated in the AC motor (induction motor) 7.

While FIG. 9 shows, as the AC-side current detection means 10, a detector that detects a current flowing through a wired line connecting the VVVF inverter 6 to the AC motor 7, which is an induction motor, by using a CT or the like, any other suitable known method along with a current flowing through the VVVF inverter 6, such as a bus current, may be used to detect the phase currents.

Reference numeral 11 denotes speed sensorless vector control means. Reference numeral 24 denotes voltage detection means. Reference numeral 31 denotes wrong action sensing means. Reference numeral 32 denotes gate stop means. The VVVF inverter 6, which converts a direct current into an alternating current having an arbitrary frequency, applies a three-phase voltage to the AC motor 7 (induction motor).

The present embodiment differs from the first and second embodiments described above in that the present embodiment includes the wrong action sensing means 31 that receives the brake command B* as an input and has offset compensation means 44 that serves to compensate an offset of the overhead wire current Is, and the gate stop means 32 that receives the brake command B* as an input.

In the present embodiment, abnormality in estimating a rotating speed of the AC motor 7 is sensed only in a brake mode.

The reason why abnormality in estimating a speed is sensed only in the brake mode in the present embodiment is, in the case of an electric vehicle, to determine the rotation direction of the induction motor, which is an AC motor, in such a way that the induction motor rotates in the direction instructed by the powering command, which is a command from the operation panel, in the powering mode.

In the brake mode, however, it is necessary to determine the rotation direction for reliable and safe braking in such a way that the voltage command outputted from the VVVF inverter 6 coincides with the direction in which the AC motor 7 rotates.

The rotating speed of the AC motor 7 cannot be obtained when the VVVF inverter 6 is not in operation.

In the speed sensorless vector control according to the present embodiment, to estimate the rotating speed of the AC motor 7 from the voltage and current generated in the VVVF inverter 6 in operation, initial speed estimation for detecting a free-run state is first performed when the VVVF inverter 6 restarts, in accordance with any of the known methods described in JP-A-2003-309996 and JP-A-2004-350459.

Figure 10:
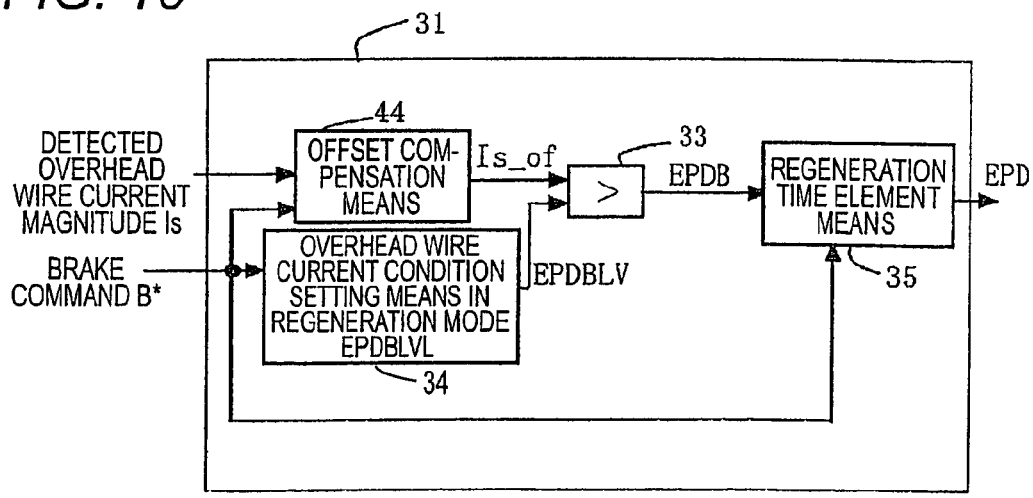
FIG. 10 shows the configuration of wrong action sensing means in the third embodiment.

FIG. 10 shows the configuration of the wrong action sensing means 31 in the present embodiment.

The wrong action sensing means 31 receives, as inputs, the detected overhead wire current value Is detected by the overhead wire current detection means 4 and the brake command B*, and includes greater comparison means 33, overhead wire current condition setting means in regeneration mode 34, regeneration time element means 35, and offset correction means 44.

Figure 11:
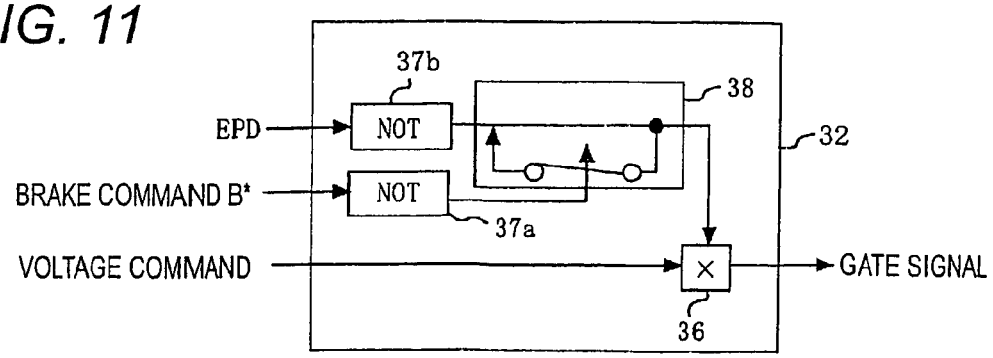
FIG. 11 shows the configuration of gate stop means in the third embodiment.

FIG. 11 shows the configuration of the gate stop means 32 in the present embodiment. The configuration and operation of the gate stop means 32 will be described later.

Figure 12:
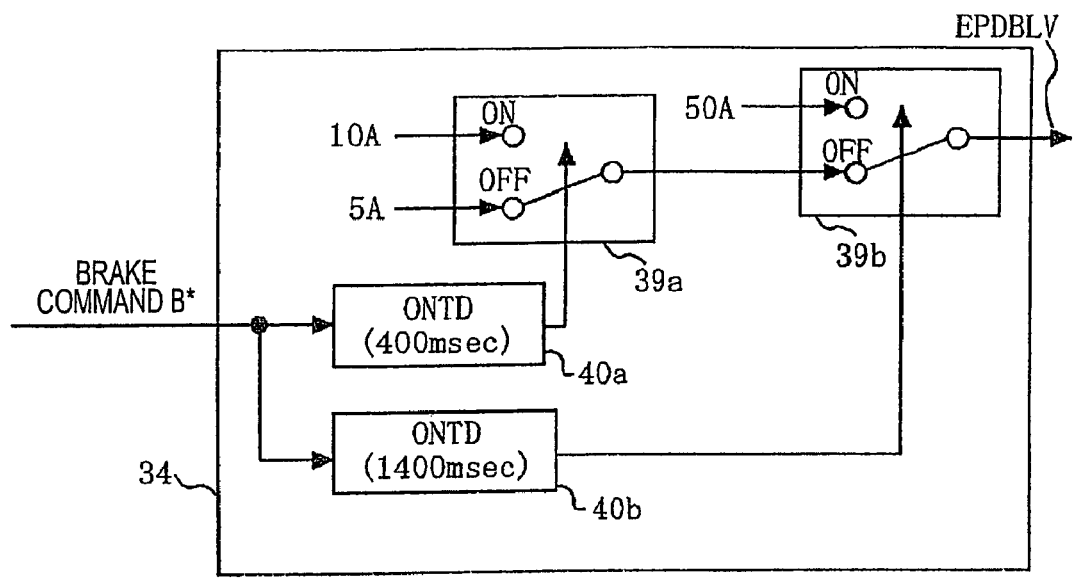
FIG. 12 shows the configuration of overhead wire current condition setting means in regeneration mode in the third embodiment.

The overhead wire current condition setting means in regeneration mode 34 in the wrong action sensing means 31 includes switching means 39, time element (ONTD) means 40a, and time element (ONTD) means 40b, as shown in FIG. 12. The time element (ONTD) means 40a sets a delay period of 400 msec.

"ONTD" stands for ON Time Delay.

The time element (ONTD) means 40b sets a delay period of 1400 msec.

Figure 13:
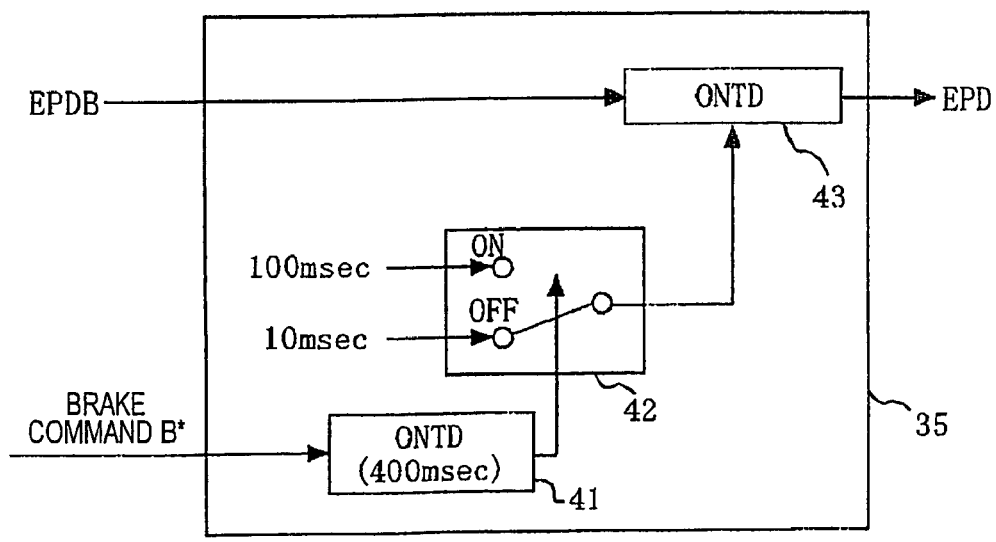
FIG. 13 shows the configuration of regeneration time element means in the third embodiment.

The regeneration time element means 35 in the wrong action sensing means 31 includes time element (ONTD) means 41, switching means 42, and variable time element (ONTD) means 43, as shown in FIG. 13.

The time element (ONTD) means 41 sets a delay period of 400 msec, and outputs an ON command to the switching means 42, 400 msec after the brake command B* is turned ON.

The switching means 42 can switch from 10 msec to 100 msec when receiving the ON command outputted from the time element (ONTD) means 41.

The variable time element (ONTD) means 43 can delay the output of the EPD signal by the output from the switching means 42 (that is, the period of 10 msec or 100 msec) after an EPDB signal is inputted.

Figure 14:
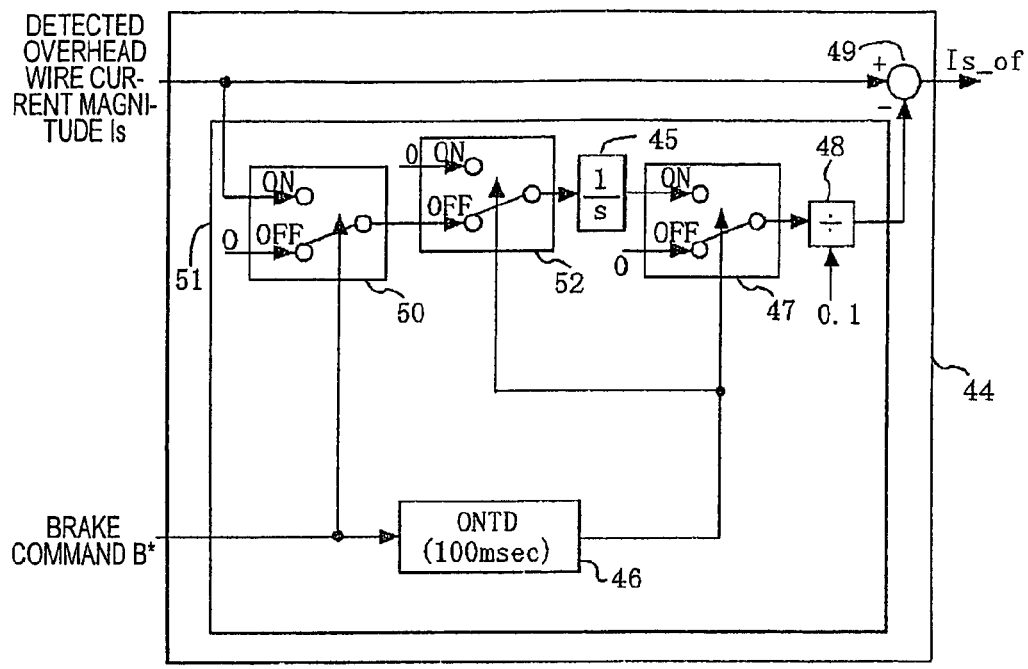
FIG. 14 shows the configuration of offset compensation means in the third embodiment.

The offset compensation means 44 includes offset computation means 51 and subtraction means 49, as shown in FIG. 14.

The offset computation means 51 includes integration means 45, time element (ONTD) means 46, switching means 47, division means 48, switching means 50, and switching means 52. The subtraction means 49 subtracts the offset computed in the offset computation means 51 from the detected overhead wire current value Is that is inputted.

In the present embodiment, wrong powering or wrong regeneration is judged based on the sign of the detected overhead wire current value Is detected by the overhead wire current detection means 4.

Therefore, when the overhead wire current detection means 4 is affected by an offset or drift due to an unnecessary DC component, wrong powering or wrong regeneration cannot correctly be judged. The offset compensation means 44 can remove an offset or drift due to an unnecessary DC component in the overhead wire current detected by the overhead wire current detection means 4 for correct judgment of wrong powering or wrong regeneration.

The offset compensation means 44 in the present embodiment is characterized in that the amount of offset is calculated only for a fixed period (100 msec) after the brake command B* is issued.

For example, to compensate a current offset, a low-frequency attenuated signal for a detected current value has been calculated, as described in accordance with "Method for attenuating DC component of detected current value by high-pass filtering detected current value" and "Method for detecting AC motor current described in JP-B-6-68503."

The methods of the related art, however, are problematic in that the calculation of the amount of offset is complicated and it takes time to carry out the calculation.

To solve the above problems, in the offset compensation means 44, the offset computation means 51 can calculate the amount of offset in a short period.

The offset computation means 51 uses the fact that there is a certain delay (time lag) after the brake command B* is issued until the VVVF inverter starts so as to detect the amount of offset for a fixed period (100 msec in the present embodiment) after the brake command B* is issued.

First, when the brake command B* is inputted, the switching means 50 switches to the detected overhead wire current value Is side. As a result, the detected overhead wire current value Is is inputted to the integration means 45.

In general, since the VVVF inverter 6 is not in operation when the brake command B* is issued, the detected overhead wire current value Is should be zero.

When the overhead wire current detection means 4 receives an offset or drift, however, the detected overhead wire current value Is is not zero even when the VVVF inverter 6 is not in operation. The integration means 45 detects the non-zero value and accumulates it for 100 msec after the brake command B* is issued.

The switching means 47 switches to ON 100 msec after the brake command B* is issued, and the switching means 52 switches to ON at the same time. The input to the integration means 45 becomes zero, and the integration means 45 stops its operation and now has the resultant amount computed for 100 msec after the brake command B* is issued.

The amount computed in the integration means 45 for 100 msec after the brake command B* is issued passes through the switching means 47, is inputted to the division means 48, and is divided by 0.1 (100 m), which is a predetermined constant, in the division means 48.

In this process, the amount of offset (or the amount of drift) can be averaged.

The subtraction means 49 subtracts the averaged amount of offset calculated by the division means 48 from the detected overhead wire current value Is detected by the overhead wire current detection means 4.

As a result, the amount of offset (or the amount of drift) in the overhead wire current can be subtracted, and hence the adverse effect of the amount of offset can be removed. The overhead wire current detection means 4 will thus not be affected by the offset.

The offset compensation means 44 removes the adverse effect of the offset in the overhead wire current detection means 4 from the detected overhead wire current value Is detected by the overhead wire current detection means 4, and inputs the resultant value Is_of to the greater comparison means 33.

The greater comparison means 33 compares the Is_of outputted from the offset compensation means 44 with a value EPDBLV outputted from the overhead wire current condition setting means in regeneration mode 34.

The value EPDBLV outputted from the overhead wire current condition setting means in regeneration mode 34 and inputted to the greater comparison means 33 is any of three types of fixed constants (that is, 5 A, 10 A, and 50 A), as shown in FIG. 12.

Which of the three types of fixed constants is changed depends on the period that has elapsed since the brake command B* was issued.

When no brake command B* is issued (that is, what is called a coasting mode in an electric vehicle), the switching means 39a and 39b choose OFF, and the fixed constant "5 A" is chosen as EPDBLV.

Figure 15:
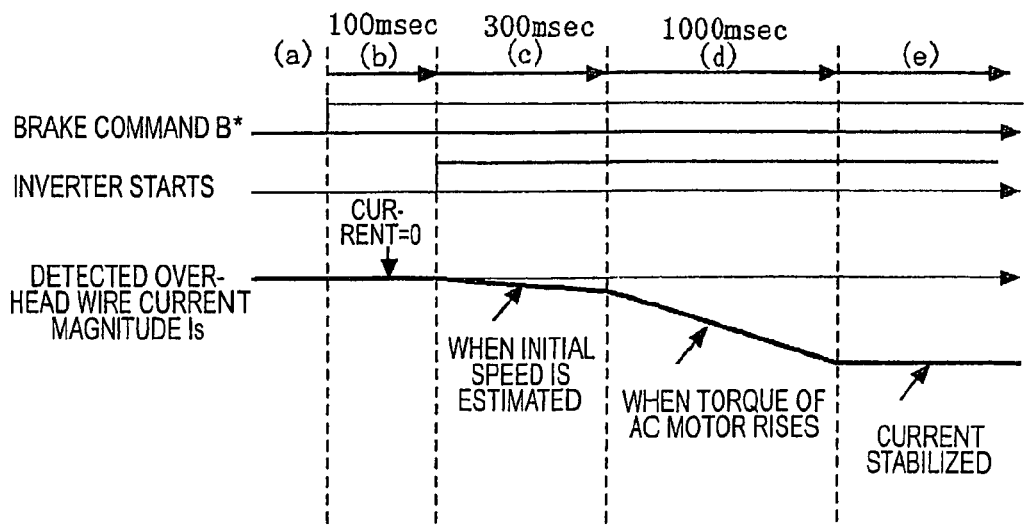
FIG. 15 shows control mode switching in the electric vehicle controller according to the third embodiment.

The period in which "5 A" is chosen consists of a coasting period during which the VVVF inverter 6 is not in operation ((a) in FIG. 15), a period of 100 msec during which the brake command has been issued but the VVVF inverter 6 is not in operation ((b) in FIG. 15), and a period of 300 msec during which the initial speed estimation for detecting the free-run state is firstly performed in accordance with the known methods described in JP-A-2003-309996 and JP-A-2004-350459 when the VVVF inverter 6 restarts.

The period (b) in FIG. 15 is a period of "overhead wire current=0," and the period (c) in FIG. 15 is a period of "initial speed estimation" during which a small amount of current flows.

Each of these periods corresponds to a control mode in which the VVVF inverter 6 is not in operation or the VVVF inverter 6 is in operation but only a small amount of current flows.

Therefore, to correctly sense the wrong powering, it is necessary to set EPDBLV to a small value, and such a method is actually employed.

After the initial speed estimation (that is, 400 msec after the brake command B* is issued) and when the torque of the AC motor 7 rises, the switching means 39a switches to ON and the switching means 39b remains OFF as shown in FIG. 13. The fixed constant "10 A" is thus chosen as EPDBLV.

The period (d) in FIG. 15 corresponds to a period during which the torque of the AC motor 7 rises and the current increases.

From the viewpoint of control, since this period (the period (d) in FIG. 15) corresponds to a period during which the torque rises, which is a transitional operation, abnormality in the speed sensorless vector control means 11 likely occurs.

It is therefore necessary to set EPDBLV (the value outputted from the overhead wire current condition setting means in regeneration mode 34) to a small value, which is readily sensed.

Then, as shown in FIG. 12, 1400 msec after the brake command B* is issued, the switching means 39b switches to ON, and "50 A" is chosen.

From the viewpoint of control, 1400 msec after the brake command B* is issued, the torque of the AC motor has been raised and stabilized. The current is therefore stabilized, and the speed sensorless vector control means 11 operates in a stable manner.

Therefore, when the speed sensorless vector control means shows abnormality in this state, it is conceivable that failure in the current detection means 10 or any other reason may abruptly produce a large current, which changes the sign of detected overhead wire current value from negative to positive. Therefore, the value "50 A", which is quite larger than the values used in the states (a) to (d) in FIG. 15, can be chosen as EPDBLV.

The greater comparison means 33 compares the value EPDBLV outputted from the overhead wire current condition setting means in regeneration mode 34 with the value Is_of obtained by using the offset compensation means 44 to remove the adverse effect of the offset in the overhead wire current detection means 4. When Is_of is greater than EPDBLV, the greater comparison means 33 outputs EPDB, which is inputted to the regeneration time element means 35.

The regeneration time element means 35 is characterized in that the period of the time element in the variable time element (ONTD) means 43 is changed in accordance with the time when the brake command B* is issued, as shown in FIG. 13.

After the greater comparison means 33 outputs the EPDB and the EPDB is inputted to the regeneration time element means 35, which delays the timing when the EPD signal is outputted by a period determined by the variable time element (ONTD) means 43 in order to prevent false sensing.

The time element of "10 msec", which is the OFF-side time element in the switching means 42, is chosen as the time element in the variable time element (ONTD) means 43 after the brake command B* is inputted but before 400 msec elapses.

This value corresponds to the state in which the inverter is not in operation or the state in which the initial speed estimation is performed, that is, after the brake command B* is inputted but before 400 msec elapses, as shown in (b) or (c) in FIG. 15.

Therefore, to sense abnormality in the speed sensorless vector control means 11 during the initial speed estimation, it is necessary to set the time element in the variable time element means 43 to a period sufficiently shorter than 300 msec. In this case, 10 msec is chosen.

After 400 msec has elapsed since the brake command B* was issued, the time element means 41 outputs an ON signal, and the switching means 42 switches to ON. The time element in the variable time element means 43 is now 100 msec.

After 400 msec has elapsed since the brake command B* was issued, the torque of the AC motor rises and the control state is implemented every 1-second time unit, as shown in (d) and (e) in FIG. 15. The period of 100 msec, which is longer than the time element during the period of the initial speed estimation, is thus chosen. Therefore, it is still possible to prevent false sensing.

The EPD signal outputted from the regeneration time element means 35 is inputted to the gate stop means 32.

The gate stop means 32 receives the EPD signal indicative of abnormality in the speed sensorless vector control means 11 and operates to stop the VVVF inverter 6.

The operation described above prevents further failure in the inverter apparatus.

The gate stop means 32 in the present embodiment differs from the gate stop means 13 in the first or second embodiment described above in that the gate stop means 32 includes latch means 38 as shown in FIG. 11. The third embodiment is characterized in this regard.

When the gate stop means 32 receives the EPD signal, which is the signal indicative of abnormality in the control operation of the electric vehicle (1 (ON-level signal) in this case), the EPD signal is inverted into "zero" by the inversion means 37b, and inputted through the latch means 38 to the multiplier 36, where the voltage signal is multiplied by the zero and the gate signal supplied to the VVVF inverter 6 is stopped.

The basic operation of the gate stop means 32 is the same as that of the gate stop means 13 in the first or second embodiment.

The gate stop means 32 in the present embodiment, however, when once receiving the EPD signal and sensing abnormality, uses the latch means 38 to hold the zero outputted from the inversion means 37b until the brake command B* is turned OFF.

As a result, the inverter remains stopped until the brake command B* is turned OFF.

Even when the inverter is stopped, activating a mechanical air-actuated brake allows the electric vehicle to perform braking. No problem will thus occur in the operation of the electric vehicle.

Therefore, when abnormality is sensed, it is effective to stop the VVVF inverter until the brake command B* is turned OFF in consideration of safe operation of the electric vehicle.

When the brake command B* is turned OFF, the holding operation of the latch means 38 is released as follows: The brake command B* is turned OFF and "zero" is inputted, which is converted into 1 in the inversion means 37a. The switch in the latch means 38 is disconnected, and the latch is released.

As described above, the electric vehicle controller according to the present embodiment includes the VVVF inverter (variable voltage variable frequency inverter) 6 that converts a direct current into an alternating current having an arbitrary frequency based on the brake command B*, the AC motor 7 connected to the AC-side of the VVVF inverter 6, the filter capacitor 5 connected in parallel to the DC-side of the VVVF inverter 6, the current detection means 10 for detecting information on the current on the AC-side of the VVVF inverter 6, the voltage detection means 24 for detecting information on the DC voltage across the filter capacitor 5, and the speed sensorless vector control means 11 for estimating the rotating speed of the AC motor 7 from the output voltage command from the VVVF inverter 6 and the output current from the VVVF inverter 6 and controlling the VVVF inverter 6 based on the estimate. The controller further includes the overhead wire current detection means (DC current detection means) 4 for detecting the current flowing through the overhead wire 1, the wrong action sensing means 31 for determining the sign of the overhead wire current when the VVVF inverter 6 is in operation by using the brake command B*, the overhead wire current (DC current) detected by the overhead wire current detection means (DC current detection means) 4, and a predetermined current setting and sensing abnormality in the speed sensorless vector control means 11 from the sign of the DC current, and the gate stop means 32 for stopping the VVVF inverter 6 when the wrong action sensing means 31 senses abnormality.

The wrong action sensing means 31 includes the value of the current (DC current) flowing through the overhead wire 1 and detected by the overhead wire current detection means (DC current detection means) 4 when the VVVF inverter 6 is operated in the regeneration mode, the current setting set to judge wrong powering in the overhead wire current condition setting means in regeneration mode 34 performing based on the brake command B*, the greater comparison means 33 for comparing the current setting set to judge the wrong powering with the current flowing through the overhead wire 1.

Therefore, according to the present embodiment, providing the wrong action sensing means for sensing abnormality in the speed sensorless vector control means from the sign of the overhead wire current detected by the overhead wire current detection means when the VVVF inverter is in operation, configuring the wrong action sensing means to include the overhead wire current (DC current) value detected by the overhead wire current detection means (DC current detection means) when the VVVF inverter is operated in the regeneration mode, the current setting set to judge wrong powering in the overhead wire current condition setting means in regeneration mode performing based on the brake command B*, and the greater comparison means 33 for comparing the current setting set to judge the wrong powering with the overhead wire current, and stopping the VVVF inverter when the wrong action sensing means senses abnormality allow abnormality in the speed sensorless vector control means to be correctly detected in a significantly simple, inexpensive configuration.

It is therefore possible to reliably prevent in advance failure of parts of the inverter apparatus due to overcurrent.

The wrong action sensing means 31 in the present embodiment further includes the offset compensation means 44 for compensating the offset component of the current detected by the overhead wire current detection means (DC current detection means) 4.

Therefore, the offset compensation means can remove an offset or drift due to an unnecessary DC component in the overhead wire current detected by the overhead wire current detection means 4 for correct judgment of wrong powering or wrong regeneration.

Fourth Embodiment

Figure 16:
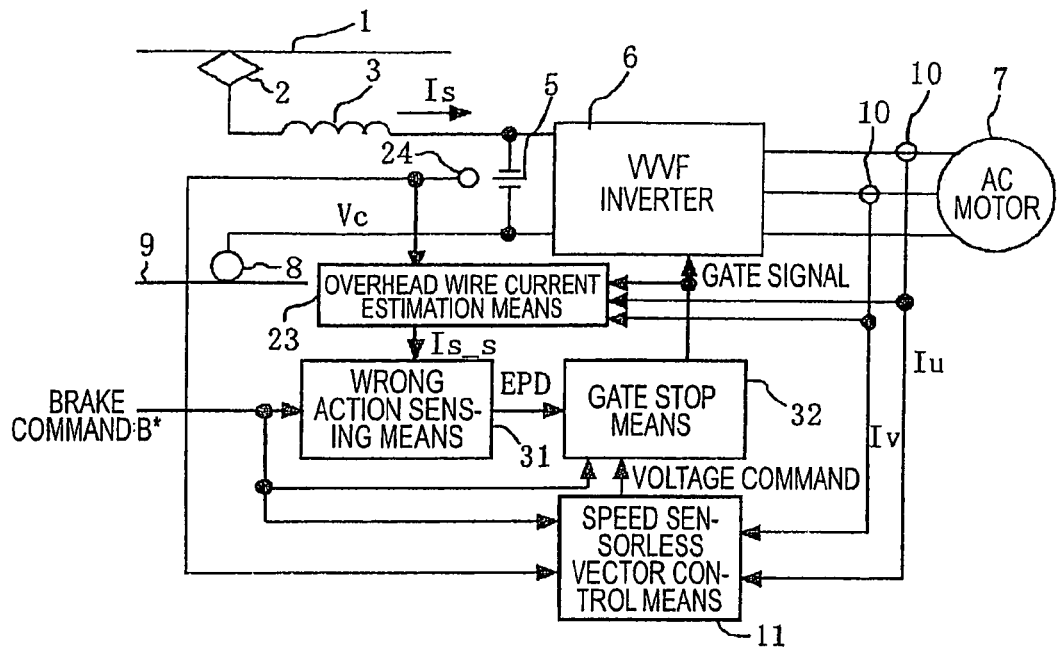
FIG. 16 shows the configuration of an electric vehicle controller according to a fourth embodiment.

FIG. 16 shows the configuration of an electric vehicle controller according to a fourth embodiment of the invention.

The electric vehicle controller according to the present embodiment will be described with reference to FIG. 16.

The present embodiment is characterized in that the electric vehicle controller is based on the configuration of the electric vehicle controller according to the third embodiment but includes overhead wire current estimation means 23 for estimating the current flowing through the overhead wire 1 and voltage detection means 24.

The overhead wire current estimation means 23 and the voltage detection means 24 are the same as those described in the second embodiment, and the configuration and operation of the overhead wire current estimation means 23 have been described in detail in the second embodiment.

The configuration and operation of the wrong action sensing means 31 and the gate stop means 32 have been described in detail in the third embodiment.

That is, the present embodiment is the combination of the third embodiment and the second embodiment.

While the operation of the electric vehicle is controlled based on the powering command P* in the second embodiment as shown in FIG. 2, the operation of the electric vehicle is controlled based on the brake command B* in the present embodiment as shown in FIG. 16.

The electric vehicle controller according to the present embodiment includes, as shown in FIG. 16, the VVVF inverter (variable voltage variable frequency inverter) 6 that converts a direct current into an alternating current having an arbitrary frequency based on the brake command B*, the AC motor 7 connected to the AC-side of the VVVF inverter 6, the filter capacitor 5 connected in parallel to the DC-side of the VVVF inverter 6, the current detection means 10 for detecting information on the current on the AC-side of the VVVF inverter 6, the voltage detection means 24 for detecting information on the DC voltage across the filter capacitor 5, and the speed sensorless vector control means 11 for estimating the rotating speed of the AC motor 7 from the output voltage command from the VVVF inverter 6 and the output current from the VVVF inverter 6 and controlling the VVVF inverter 6 based on the estimate. The controller further includes the overhead wire current estimation means (DC current estimation means) 23 for estimating the current flowing through the overhead wire 1, the wrong action sensing means 31 for determining the sign of the estimated value of the current flowing through the overhead wire 1 (estimated DC current value) when the VVVF inverter 6 is in operation by using the brake command, the estimated value of the current flowing through the overhead wire 1 (estimated DC current value) estimated by the overhead wire current estimation means (DC current estimation means) 23, and a predetermined current setting and sensing abnormality in the speed sensorless vector control means 11 from the sign of the estimated value of the current flowing through the overhead wire 1 (estimated DC current value), and the gate stop means 32 for stopping the VVVF inverter when the wrong action sensing means 31 senses abnormality.

As in the second embodiment described above, the overhead wire current estimation means 23 includes the inverter DC input current estimation means 29 for estimating the inverter DC input current inputted through the overhead wire 1 to the VVVF inverter 6 based on the current information detected by the current detection means 10 and the switching state in the VVVF inverter 6, the capacitor input current estimation means 28 for estimating the capacitor input current inputted through the overhead wire 1 to the filter capacitor 5, and the adder 30 that adds the estimated current value from the inverter DC input current estimation means 29 to the estimated current value from the capacitor input current estimation means 28 and inputs the resultant value to the wrong action sensing means 31.

The configuration and operation of each of the wrong action sensing means 31, the gate stop means 32, and other components are the same as those in the third embodiment described above.

As described above, according to the present embodiment, providing the wrong action sensing means for sensing abnormality in the speed sensorless vector control means from the sign of the overhead wire current estimated by the overhead wire current estimation means when the VVVF inverter is operated based on the brake command, and stopping the VVVF inverter when the wrong action sensing means senses abnormality allow abnormality in the speed sensorless vector control means to be readily and correctly detected in a significantly simple, inexpensive configuration.

It is therefore possible to prevent in advance failure of parts of the inverter apparatus due to overcurrent.

Fifth Embodiment

Figure 17:
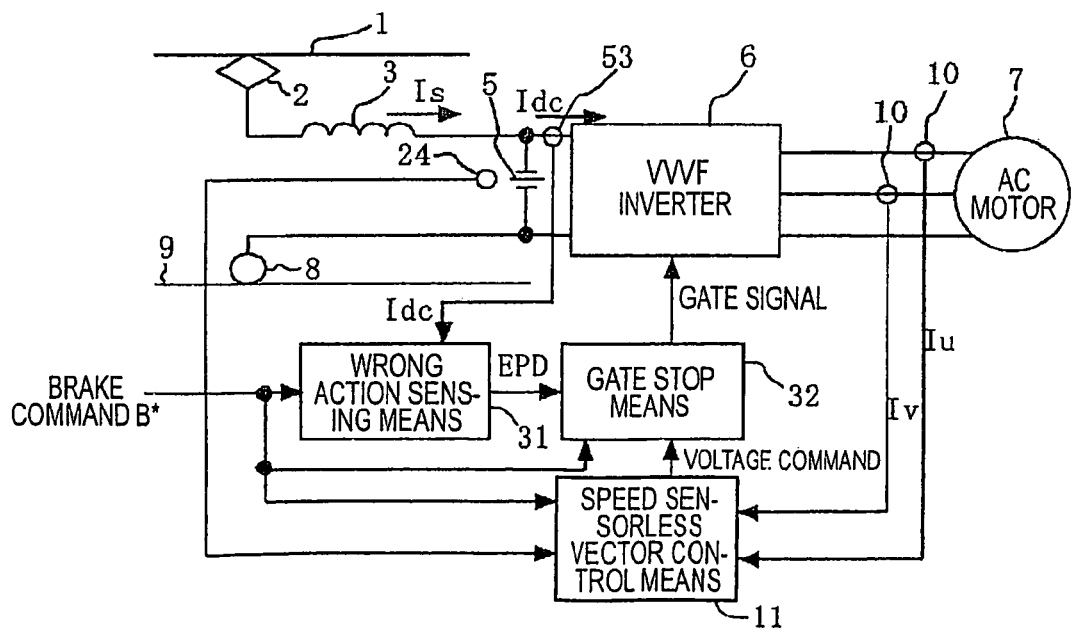
FIG. 17 shows the configuration of an electric vehicle controller according to a fifth embodiment.

FIG. 17 shows the configuration of an electric vehicle controller according to a fifth embodiment of the invention.

The electric vehicle controller according to the present embodiment will be described with reference to FIG. 17.

The present embodiment is characterized in that the overhead wire current detection means 4 is replaced with inverter current detection means 53 in the configuration of the third embodiment shown in FIG. 9.

The other portions are the same as those in the third embodiment and have the same reference characters.

The portions having reference characters that are the same as those in the third embodiment will not be described.

The present embodiment differs from the third embodiment and is characterized in that the inverter current Idc is detected to sense abnormality in the speed sensorless vector control means 11.

That is, the electric vehicle controller according to the present embodiment includes, as shown in FIG. 17, the variable voltage variable frequency inverter (VVVF inverter) 6 that converts a direct current into an alternating current having an arbitrary frequency based on the brake command B*, the AC motor 7 connected to the AC-side of the VVVF inverter 6, the filter capacitor 5 connected in parallel to the DC-side of the VVVF inverter 6, the current detection means 10 for detecting information on the current on the AC-side of the VVVF inverter 6, the voltage detection means 24 for detecting information on the DC voltage across the filter capacitor 5, and the speed sensorless vector control means 11 for estimating the rotating speed of the AC motor 7 from the output voltage command from the VVVF inverter 6 and the output current from the VVVF inverter 6 and controlling the VVVF inverter 6 based on the estimate. The controller further includes the inverter current detection means (DC current detection means) 53 for detecting the inverter current flowing through the VVVF inverter 6, the wrong action sensing means 31 for determining the sign of the inverter current (DC current) when the VVVF inverter 6 is in operation by using the brake command B*, the inverter current (DC current) detected by the inverter current detection means (DC current detection means) 53, and a predetermined current setting and sensing abnormality in the speed sensorless vector control means 11 from the sign of the inverter current (DC current), and the gate stop means 32 for stopping the VVVF inverter 6 when the wrong action sensing means 31 senses abnormality.

As described in the present embodiment, abnormality in the speed sensorless vector control means 11 can be sensed, as in the third embodiment, by detecting the inverter current Idc instead of the overhead wire current Is.

When the inverter current detection means 53 is used to detect the inverter current, the inverter current detection means 53 can be incorporated in and attached to the inverter apparatus in advance.

The attachment can therefore be simplified as compared to the case where the overhead wire current detection means is attached in the third embodiment.

Further, the detection means can be stably attached in the inverter apparatus against, for example, vibration of the electric vehicle.

As described above, according to the present embodiment, providing the wrong action sensing means for sensing abnormality in the speed sensorless vector control means from the sign of the inverter current detected by the inverter current detection means when the VVVF inverter is in operation, and stopping the inverter when the wrong action sensing means senses abnormality allow abnormality in the speed sensorless vector control means to be readily and correctly detected in a significantly simple, inexpensive configuration.

It is therefore possible to prevent in advance failure of parts of the inverter apparatus due to overcurrent.

Sixth Embodiment

Figure 18:
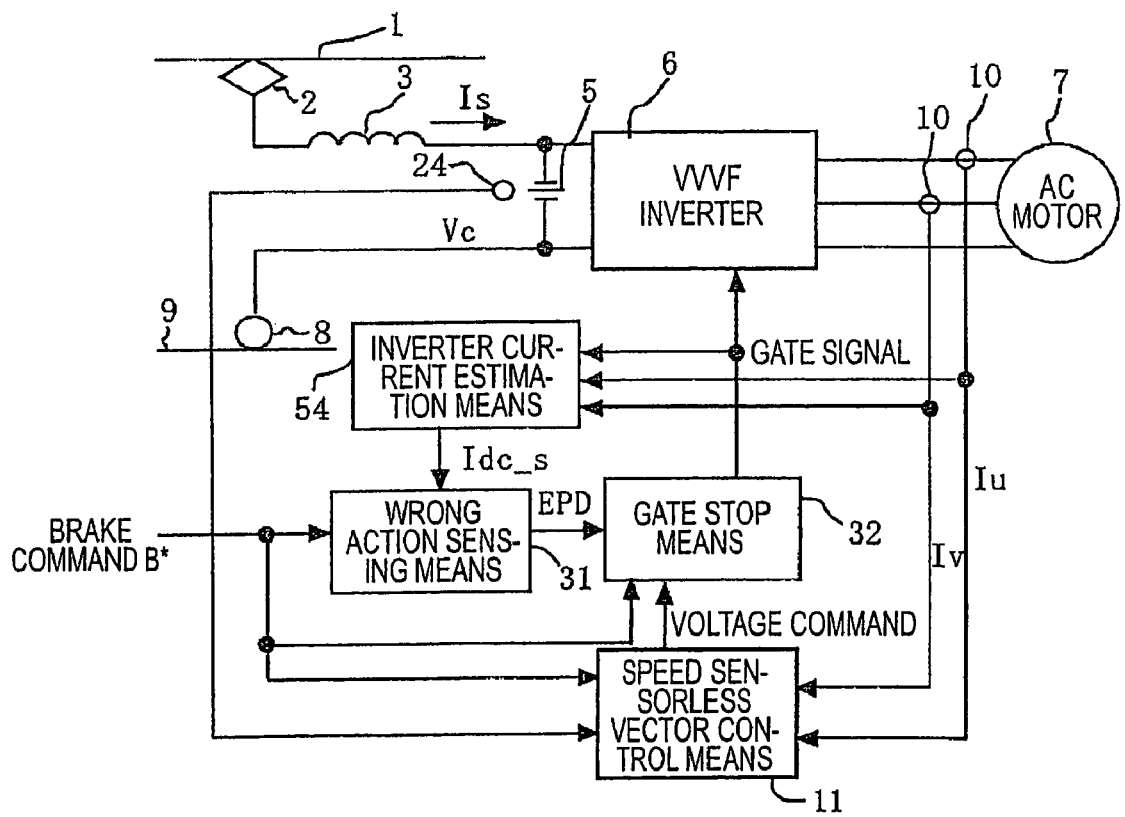
FIG. 18 shows the configuration of an electric vehicle controller according to a sixth embodiment.

FIG. 18 shows the configuration of an electric vehicle controller according to a sixth embodiment of the invention.

The electric vehicle controller according to the present embodiment will be described with reference to FIG. 18.

The present embodiment differs from the fourth embodiment in that the overhead wire current estimation means 23 is replaced with inverter current estimation means 54.

The other portions are the same as those in the fourth embodiment and have the same reference characters.

The present embodiment differs from the fourth embodiment and is characterized in that abnormality in the speed sensorless vector control means 11 is sensed by estimating the inverter current and computing Idc_s (estimated inverter DC input current).

The estimated inverter current value Idc_s (estimated inverter DC input current) is computed in accordance with the equation (4) in the second embodiment.

That is, the electric vehicle controller according to the present embodiment includes, as shown in FIG. 18, the VVVF inverter (variable voltage variable frequency inverter) 6 that converts a direct current into an alternating current having an arbitrary frequency based on the brake command B*, the AC motor 7 connected to the AC-side of the VVVF inverter 6, the filter capacitor 5 connected in parallel to the DC-side of the VVVF inverter 6, the current detection means 10 for detecting information on the current on the AC-side of the VVVF inverter 6, the voltage detection means 24 for detecting information on the DC voltage across the filter capacitor 5, and the speed sensorless vector control means 11 for estimating the rotating speed of the AC motor 7 from the output voltage command from the VVVF inverter 6 and the output current from the VVVF inverter 6 and controlling the VVVF inverter 6 based on the estimate. The controller further includes the inverter current estimation means (DC current estimation means) 54 for estimating the inverter current flowing through the VVVF inverter 6, the wrong action sensing means 31 for determining the sign of the estimated inverter current value (estimated DC current value) when the VVVF inverter 6 is in operation by using the brake command B*, the estimated inverter current value (estimated DC current value) estimated by the DC current estimation means (DC current estimation means) 54, and a predetermined current setting and sensing abnormality in the speed sensorless vector control means 11 from the sign of the estimated inverter current value (estimated DC current value) and the gate stop means 32 for stopping the VVVF inverter 6 when the wrong action sensing means 31 senses abnormality.

As described in the present embodiment, abnormality in the speed sensorless vector control means 11 can be sensed, as in the second and fourth embodiments, by estimating the estimated inverter current value Idc_s instead of the estimated overhead wire current value Is_s.

In the present embodiment, in particular, since the inverter current estimation means 54 estimates the inverter current Idc, it is not necessary to compute the equation (1) or (2) described above, unlike the second and fourth embodiments. The load factor on the microcomputer and the amount of computation performed therein can therefore be reduced.

As described above, providing the wrong action sensing means for sensing abnormality in the speed sensorless vector control means from the sign of the inverter current estimated by the inverter current estimation means when the inverter is in operation, and stopping the inverter when the wrong action sensing means senses abnormality allow abnormality in the speed sensorless vector control means to be readily and correctly detected in a significantly simple, inexpensive configuration.

It is therefore possible to prevent in advance failure of parts of the inverter apparatus due to overcurrent.

INDUSTRIAL APPLICABILITY

The invention is applicable to a controller of an electric vehicle that uses an AC motor as a drive source and particularly uses speed sensorless vector control means along with a VVVF inverter to control the AC motor.

The invention claimed is:
1. An electric vehicle controller comprising:
   a VVVF inverter that converts a direct current into an alternating current having an arbitrary frequency based on a powering command or a brake command;
   an AC motor connected to the AC-side of the VVVF inverter;
   a filter reactor connected in series to the DC-side of the VVVF inverter;
   a filter capacitor connected in parallel to the DC-side of the VVVF inverter;
   a current detector detecting information about the current on the AC-side of the VVVF inverter;
   a voltage detector detecting information about the DC voltage across the filter capacitor;
   a speed sensorless vector controller estimating the rotating speed of the AC motor from an output voltage command from the VVVF inverter and an output current from the VVVF inverter and controlling the VVVF inverter based on the estimate;
   a DC current detector, being either an overhead wire current detector detecting the current flowing through an overhead wire or an inverter current detector detecting the inverter current flowing through the VVVF inverter;
   a wrong action sensor determining the sign of the DC current, when the VVVF inverter is in operation by using either a powering command or a brake command, either an overhead wire current or an inverter current detected by the DC current detector, and a predetermined current setting, and sensing an abnormality in the speed sensorless vector controller from the sign of the DC current; and
   a gate stopper stopping the VVVF inverter when the wrong action sensor senses an abnormality,
   wherein the wrong action sensor includes:
   a wrong regeneration sensor comparing the value of either of the DC currents, the overhead wire current or the inverter current detected by either the DC current detector, the overhead wire current detector or the inverter current detector, with a first current setting set to judge wrong regeneration when the VVVF inverter is operated in the powering mode, and allowing a fixed period determined by the resonant frequency between the filter reactor and the filter capacitor to elapse when the first current setting is greater,
   a wrong powering sensor comparing the value of either of the DC currents, the overhead wire current or the inverter current detected by either of the DC current detector, the overhead wire current detector or the inverter current detector, with a second current setting set to judge wrong powering when the VVVF inverter is operated in the regeneration mode, and allowing a fixed period determined by the resonant frequency between the filter reactor and the filter capacitor to elapse when the second current setting is smaller, and
   a powering/regeneration sensing selector selecting the wrong regeneration sensor in the powering operation, whereas selecting the wrong powering sensor in the regeneration operation based on either of the commands, the powering command or the brake command.

2. The electric vehicle controller according to claim 1, wherein the wrong action sensor includes the value of either of the DC currents, the overhead wire current or the inverter current detected by either the DC current detector, the overhead wire current detector or the inverter current detector, when the VVVF inverter is operated in the regeneration mode, a current setting set to judge wrong powering in overhead wire current condition setter in regeneration mode performing based on the brake command, and if-greater comparison means for comparing the current setting set to judge the wrong powering with either of the DC currents, the overhead wire current or the inverter current.

3. The electric vehicle controller according to claim 2, wherein the wrong action sensor further includes an offset compensator compensating an offset component of the current detected by the DC current detector, and
   the offset compensator calculates the amount of offset in the period from the issue of the powering command or the brake command to the start of the VVVF inverter.

* * * * *